Patented June 3, 1941

2,244,289

UNITED STATES PATENT OFFICE 2,244,289

PREPARATION OF INFUSIBLE RESINS

David E. Cordier, Toledo, Ohio, assignor to Plaskon Company, Incorporated, Toledo, Ohio, a corporation of Delaware No Drawing. Application January 30, 1939, Serial No. 253,632

6 Claims. (Cl. 260—69)

The invention relates to infusible resins, and more particularly to those formed by the reaction of methyl, ethyl, propyl, butyl or amyl biuret

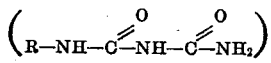

with formaldehyde and its polymers.

Most urea derivatives do not form thermosetting resins with formaldehyde. Moreover, nearly all the known resins that are formed by the reaction of formaldehyde with various compounds are without practical value because of undesirable physical properties or color, or poor heat resistance, water resistance or light resistance. Most of them are thermoplastic, or so slowly thermosetting that they may be regarded for all practical purposes as thermoplastic.

An important difficulty with most resin-forming reactions is the impossibility of arresting the reaction at a suitable intermediate stage. It is usually difficult to obtain the kind of intermediate reaction product that is necessary to make possible the commercial production of the resin.

To be suitable for ordinary purposes, such as casting or molding under pressure, the intermediate reaction product should be one that can be converted into an infusible resin without material evolution of water. Therefore, the preferred resin-forming reaction is not one that consists of condensation alone, but is one that includes condensation only in its initial stage. The final stage of the reaction in which the infusible resin is formed should consist of polymerization rather than condensation, because water is evolved in a condensation reaction.

Since synthetic resins are chiefly used in molded or laminated products containing a fibrous filler, the intermediate reaction product that is obtained after the completion of all condensation should be a nonvolatile substance that can be incorporated with the filler in the form of an impregnating syrup.

The infusibility and insolubility of certain resins is believed to be due to the great size and complexity of the resin molecules. Since the urea molecule is relatively simple, a substitute for urea having a larger and more complex molecule is desirable in order that a resin having greater heat resistance and water resistance than formaldehyde-urea resin may be produced.

Biuret can be made to react with formaldehyde only with great difficulty. The ingredients do not react unless made strongly acid, and the resulting reaction product can be converted into an infusible resin only by treating it with strong alkali. The present invention is based upon the discovery that alkyl biurets react readily with formaldehyde to form a commercially usable intermediate reaction product capable of conversion without difficulty by heat into a colorless, infusible resin that is insoluble, is unaffected by light, and has good physical properties, water resistance and heat resistance. No explanation is known for the fact that alkyl biurets behave in an entirely different manner from biuret itself.

The principal object of the invention is the production of resins and potential resins by reacting alkyl biurets with formaldehyde and its polymers.

More specific objects and advantages are apparent from the description, which merely discloses and illustrates the invention and is not intended to impose limitations upon the claims.

In accordance with the invention, alkyl biurets may be reacted either with formaldehyde or with a polymer thereof, such as paraformaldehyde, but are preferably reacted with a solution of formaldehyde in water, in an organic solvent such as an alcohol, or in a liquid containing both water and an organic solvent. If an organic solvent such as ethyl, propyl or butyl alcohol is employed, a solution of an intermediate reaction product is obtained that is suitable for use in lacquers. The reaction may be performed in an autoclave, if desired, to secure a reaction temperature above the boiling point of the solvent.

Intermediate reaction product

When a formaldehyde solution is used for the reaction with alkyl biurets, the solution is preferably about neutral at the start of the reaction. Although a molar formaldehyde-alkyl biuret ratio of 2:1 or 1½:1 is preferred, an excess of formaldehyde may be used if desired. The reaction is expedited by heating or refluxing the solution.

A lacquer solution may be prepared as follows: 1 mol (16 grams) of n-butyl biuret is added to 2 mols of formaldehyde in a 37 per cent aqueous solution (16 grams), and triethanolamine is added to bring the pH to about 8. After the solution has been evaporated to reduce its volume by ⅓, 10 c. c. of a 10% methyl alcohol solution of phthalic acid and 15 c. c. of methyl Cellosolve are added. The solution is then evaporated until 29 grams remain. The resulting lacquer when applied and baked forms a hard, clear film that is insoluble, unaffected by light, heat-resistant, and water-resistant.

For many purposes it is convenient to allow the soluble type of intermediate reaction product to remain in the form of a solution. Such a solution, after the addition of any desired ingredients, may be used as a binder in the production of impregnated or laminated products, as an adhesive for applications such as the manufacture of plywood, as a dressing or crease-proofing agent for textiles, as an ingredient for lacquers or coating compositions, as a flame-proofing agent for wood, and as a composition to be converted into a foam that can be hardened to produce an insulating material.

Fillers, plasticizers, hot plate lubricants, opacifiers, accelerators, dyestuffs, pigments, and other coloring matter may be incorporated if desired before the conversion of the intermediate reaction products into the infusible resin. The conversion of the intermediate reaction products to the infusible resin is preferably carried out in the presence of an acid.

An aqueous solution of an intermediate reaction product embodying the invention may be prepared as follows: 1 mol (159 grams) of n-butyl biuret is added to 2 mols of formaldehyde in a 37 per cent aqueous solution (162 grams). After triethanolamine has been added to bring the pH to 7.5 or 8, the solution is kept at 50° C. for 60 minutes, and then allowed to cool.

Molding compositions

The preferred molding composition embodying the invention comprises a filler and an intermediate reaction product of an alkyl biuret and formaldehyde that is capable of conversion by heat into an infusible resin. In the preferred method of preparing a molding composition, the filler is impregnated with a solution of a soluble intermediate reaction product, and the solvent is removed.

If fibrous cellulosic material in the form of paper pulp, wood flour or the like is employed as the filler, an aqueous solution of the reaction product used for impregnating the cellulosic material is preferably rendered acid (pH of about 2 to about 5), with an organic rather than an inorganic acid. Heat may be used to facilitate the drying of the impregnated cellulose or other filler, but the drying temperature should not be sufficient to render the composition infusible. After the water or other solvent has been removed, the dry product may be ground to a powder to render it homogeneous, and the powder may be employed in the usual manner for the production of molded articles.

The preferred procedure for preparing a molding composition from the aqueous solution obtained in accordance with the specific process that has been described is as follows: The solution is brought to pH 4 by the addition of a 10% methyl alcohol phthalic acid solution, and is stirred with an amount of alpha-cellulose fiber that is roughly equal to the amount of n-butyl biuret used for the original reaction. After the solution has been thoroughly and uniformly absorbed by the cellulose, the wet mass is placed in a dryer at 185° F. to remove the water. Then the dry impregnated cellulose is ground in a ball mill, and any of the usual modifying agents may be added during the grinding. The resulting molding powder, if desired, may be compressed into blanks or preforms of the proper size for use in various molds, and the molding is performed at a temperature corresponding to about 30 pounds steam pressure.

Although a process for converting the intermediate reaction products into molded articles containing fillers has been described by way of example, these reaction products may be converted into finished articles by other methods, for example, by casting in open molds and baking. If no filler is used, transparent articles can be produced.

Incorporation with other resins

Since the infusible resin of the present invention is colorless, the intermediate reaction product can be incorporated with a great variety of other resins or potential resins. Also, mixed reaction products of formaldehyde with alkyl biuret and another substance can be produced. The intermediate reaction product of formaldehyde with the alkyl biuret in the resulting composition is then converted to the infusible resin, so that a blend or copolymer of the alkyl biuret-formaldehyde resin with the other resin or resins is obtained.

For example, the resin has been found to be quite compatible with resins formed by the reaction of formaldehyde and urea, or an equivalent thereof such as thiourea. The intermediate reaction product that has been described may be incorporated with a potential resin made from formaldehyde and urea; either urea or alkyl biuret may be added to a reaction product of the other with formaldehyde; or the process may be commenced by reacting both simultaneously with formaldehyde.

The alkyl biurets that may be reacted with formaldehyde in accordance with the invention are methyl, ethyl, propyl, butyl and amyl biuret. For example, an equivalent amount of n-amyl, n-butyl, n-propyl, ethyl or methyl biuret may be substituted for the n-butyl biuret in the foregoing examples.

The embodiments of the invention that have been described may be modified to meet various requirements.

Having described my invention, I claim:

1. A method of producing an intermediate reaction product capable of conversion by heat into an infusible resin that comprises reacting n-butyl biuret with a substance selected from the group consisting of formaldehyde and polymers thereof.

2. A method of producing an infusible resin that comprises reacting n-butyl biuret with a substance selected from the group consisting of formaldehyde and polymers thereof to form an intermediate reaction product, and carrying out the conversion of said product to an infusible resin in the presence of an acid.

3. A method of producing an infusible resin that includes preparing a composition comprising intermediate reaction products of formaldehyde with both urea and n-butyl biuret, and carrying out the conversion of said ingredients into a resin.

4. An intermediate reaction product of n-butyl biuret and formaldehyde capable of conversion by heat into an infusible resin.

5. An infusible resin comprising reaction products of formaldehyde with both n-butyl biuret and urea.

6. An infusible resinous reaction product of n-butyl biuret and formaldehyde.

DAVID E. CORDIER.